United States Patent [19]

Mantkowski

[11] Patent Number: 5,075,966
[45] Date of Patent: Dec. 31, 1991

[54] METHOD FOR FABRICATING A HOLLOW COMPONENT FOR A ROCKET ENGINE

[75] Inventor: Thomas E. Mantkowski, Cincinnati, Ohio

[73] Assignee: General Electric Company, Cincinnati, Ohio

[21] Appl. No.: 577,241

[22] Filed: Sep. 4, 1990

[51] Int. Cl.$^5$ .............................................. B23P 17/00
[52] U.S. Cl. ................................... 29/890.01; 29/424; 29/488; 29/890.02
[58] Field of Search ................ 29/890.01, 890.02, 423, 29/424, 458, 527.4, 530; 164/518, 519; 239/127.1, 127.3; 60/260, 267, 271

[56] References Cited

U.S. PATENT DOCUMENTS

| | | | |
|---|---|---|---|
| 3,521,345 | 7/1970 | Gould et al. | 29/890.01 |
| 3,595,025 | 7/1971 | Stokel et al. | 29/890.01 |
| 3,613,207 | 10/1971 | Malburg | 29/890.01 |
| 4,582,678 | 4/1986 | Niino et al. | 29/890.01 |
| 4,584,171 | 4/1986 | Niino et al. | 29/890.01 |
| 4,707,225 | 11/1987 | Schuler et al. | 29/890.01 |
| 4,856,163 | 8/1989 | Horiuchi et al. | 29/890.01 |
| 4,942,653 | 7/1990 | Hawkinson | 29/890.01 |

*Primary Examiner*—Irene Cuda
*Attorney, Agent, or Firm*—Charles L. Moore, Jr.; Jerome C. Squillaro

[57] ABSTRACT

A method for making an engine component with a hollow interior includes the steps of: selectively patterning a principal substrate surface; forming a slurry including a selected amount of a binder material, a selected amount of a solvent and a selected amount of a filter material; inserting the slurry into the substrate surface pattern; evaporating the solvent to solidify the slurry; depositing a close-out layer of material over the patterned substrate surface and over the solidifed slurry; and without removing the close-out layer, removing the solidified slurry to provide a structure with a hollow interior.

21 Claims, 5 Drawing Sheets

METHOD FOR FABRICATING A HOLLOW COMPONENT FOR A ROCKET ENGINE

BACKGROUND OF THE INVENTION

The present invention relates to the fabrication of hollow structures and, more particularly to a novel method for fabricating components for rocket engines, gas turbine engines and the like which have hollow structures.

A conventional method for manufacturing hollow structures includes the step of forming the desired interior configuration in a side portion of a workpiece either by machining the workpiece to form the shape of the hollow interior, or by casting the workpiece with the desired hollow interior shape formed in the workpiece side portion. A filler or mandrel is then machined or otherwise formed which corresponds substantially to the shape of the hollow interior; the mandrel is placed in contacting mated relation with the interior configuration formed in the workpiece, to provide a core. A close-out layer of material or hot wall, as it is sometimes referred to, is applied over the mandrel and connected to the boundary edges of the workpiece around the mandrel to close the structure over the mandrel and to complete the workpiece. Access to the interior mandrel or filler material must be available after the close-out layer is deposited. The mandrel or filler material may then be dissolved by chemical etching and the like to remove it from the interior of the workpiece and thereby provide a hollow structure. The etchant must only attack the filler material and not the workpiece and close-out material. The materials used for the workpiece, close-out and mandrel are therefore restricted to be compatible with the etching operation.

Conventional methods for forming structures with hollow interiors, similar to the method described above, have several disadvantages. Intricate hollow interior structures, such as a re-entrant angle or the surpentine interior configuration of a gas turbine engine blade, vane, or the like, cannot be easily formed using the above-described method; the method is also not suitable for making numerous, small voids or hollows in a large component, such as cooling channels in the wall of a combustion chamber of a liquid propellant rocket engine, scramjet engine or the like. A precisely machined mandrel would have to be formed and inserted into each one of a multiplicity of channels formed around an interior wall of the combustion chamber before a close-out layer of material is deposited, necessarily a very laborious and time consuming operation. The process is further complicated in that the channels are not necessarily of uniform dimensions throughout their entire extent.

Another disadvantage of current methods is that the mandrel is typically an iron or titanium tube; an iron tube is typically dissolved with hot phosphoric acid and a titanium tube is typically dissolved with room temperature hydrofluoric acid. Thus the mandrel is sacrificed and the waste must be properly disposed of.

The chemical ething or leaching operation of conventional methods to remove the mandrel material is typically extremely slow, and disposal of the resulting waste material can be expensive and is an environmental concern. The choice of materials for the workpiece, close-out and mandrel is thus restricted so that the chemical etchant used will only dissolve the mandrel material.

SUMMARY OF THE INVENTION

It is accordingly a primary object of the present invention to provide a novel method for fabricating a hollow structure which is not subject to the foregoing disadvantages.

It is another object of the present invention to provide a method for fabricating hollow components with minute, intricate interior structures including re-entrant angles.

It is a further object of the present invention to provide a method for fabricating a hollow structure that does not require the precise machining of a mandrel or filler.

It is yet another object of the present invention to provide a method for making a hollow structure in which the filler material can be efficiently and simplistically removed from the structure interior.

In accordance with the invention, a method for fabricating a hollow interior structure for gas turbine engine, rocket engine or the like includes the steps of: selectively patterning a surface of a substrate; forming a slurry including a selected amount of a binder material, a selected amount of a solvent and a selected amount of a filler material; inserting the slurry into the substrate surface pattern; evaporating the solvent to solidify the slurry and to form a filler; depositing a close-out layer of material over the patterned substrate surface and filler; and removing the filler to provide the hollow interior structure.

In an alternate embodiment, a first layer of material comprising a mixture of at least a selected amount of the binder material and a selected amount of the solvent is inserted into the substrate surface pattern; the solvent is evaporated. A second layer of slurry material comprising selected amounts of each of the binder material, the solvent and the filler material are inserted into the substrate surface pattern over the first layer; the solvent in the second layer is then evaporated. A close-out layer is deposited and the substrate is then heated at a chosen temperature for a selected duration, to volatilize the first layer of material. The second layer of material may then removed to provide the hollow interior structure.

Other objects of the invention, together with the features and advantages thereof, will become apparent from the following detailed specification when read with the accompanying drawings.

DETAILED DESCRIPTION OF THE PREFERRED EMBODIMENTS

Figure 1A:
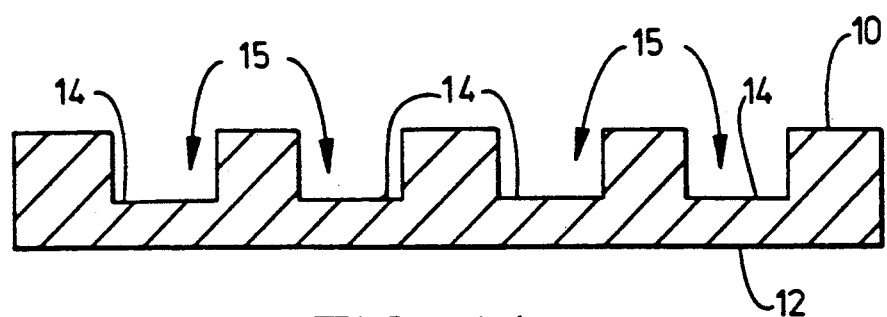
FIGS. 1A–1D are cross-sectional, side elevation views of the steps employed in the hollow structure fabrication method in accordance with one embodiment the present invention.

Referring initially to FIG. 1A, a principal surface 10 of a substrate 12 is selectively patterned to form a hollow 14 of a desired interior configuration in the surface. A plurality of rectangular grooves 15 an shown in FIG. 1A but any hollow interior configuration could be used, including a configuration employing a re-entrant angle or other complex geometry. In accordance with the present invention, the selectively patterned hollows (or grooves 14) are filled with a slurry material 16. The slurry comprises a mixture of at least a binder material, a solvent and a filler material to form a slurry having a paste-like consistency. The solvent material is chosen to be compatible or nonreactive with the other materials used and for convenience (slow drying) because the choice of solvent material will determine how much time it will take for the slurry to solidify or harden in grooves 14; in some applications it may be desirable for the slurry to remain in a paste-like consistency for a longer period of time while it is applied to the hollow interior configuration formed in principal substrate surface 10.

If substrate 12 is a metal, such as a super-alloy or a high conductivity alloy used in a rocket engine, gas turbine engine or the like, the binder material may be a material similar to that used in currently known manufacturing processes, such as activated diffusion healing (ADH), activated diffusion cladding (ADC), partitioned alloy component healing (PACH) or brazing. Typically, an acrylic, thermoplastic or the like is used as a binder in these processes. The binder material may generally be any material which can easily be inserted into grooves 14 before solidification and will not leave a residue after vacuum heating at a temperature above about 700 degrees F.

The solvent may be a xylene, toluene, isopropyl alcohol, acetone or the like, and the filler material may be a salt, sand, a ceramic powder or a powdered metal. The filler material is chosen to preferably have the following properties:

(a) compatibility or nonreactivity with the other materials;

(b) high melting point or at least a melting point higher than the highest process temperature; and (c) ability to be easily removed or flushed from the interior after substrate surface 10 is closed to complete the hollow structure as will be disclosed in more detail hereinbelow.

The quantity of each constituent of the slurry material is selected according to convenience, that is, the ease with which it is desired that the slurry be applied and the length of time that it takes the solvent to evaporate and the slurry to solidify or harden. The slurry preferably has a consistency that permits it to be troweled onto principal substrate surface 10 and into grooves 14; although, a slurry consistency that permits a more automated means of application, such as spraying and the like, may be practical in some processes to improve production efficiency. For application by trowel, a mixture of about 60% to about 70% filler material, about 20% to about 30% solvent, and about 10% to about 20% binder material is sufficient.

Figure 1B:
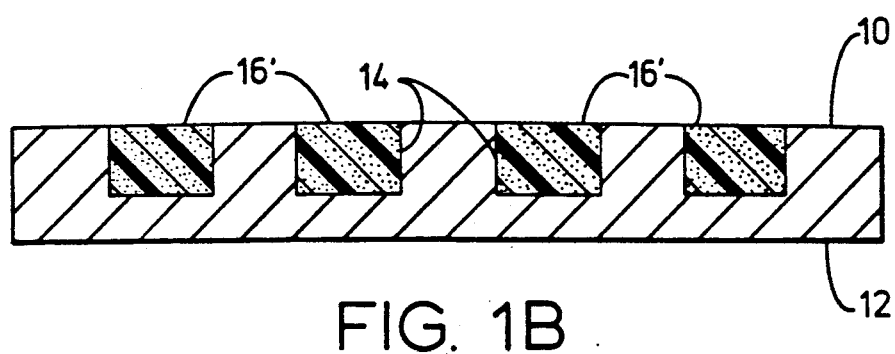

Substrate 12 may be heated or baked at about 200 degrees F. to about 350 degrees F for about 2 to about 3 hours to facilitate evaporation of the solvent and to solidify the slurry. Excess slurry material may be removed either before the slurry is solidified or after slurry solidification to remove any excess slurry material from principal substrate surface 10 and to leave only slurry segments 16' in grooves 14 (FIG. 1B).

Figure 1C:
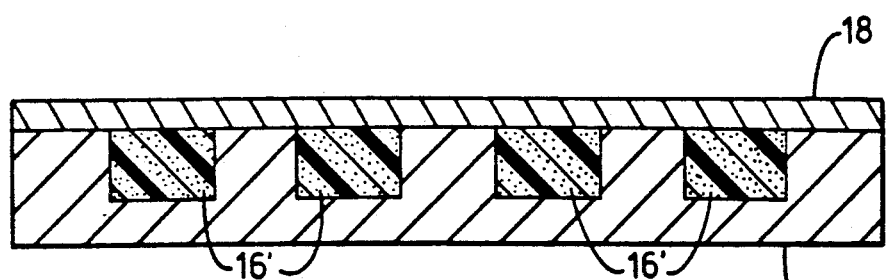

Referring now to FIG. 1C, after the solvent has evaporated and the slurry has solidified, a layer 18 of material, hereinafter referred to as a close-out layer or a hot wall, is deposited on principal substrate surface 10 and over solidified slurry segments 16'. If substrate 10 is a component part of a rocket engine or a gas turbine engine, made from a high heat resistant material, such as a super-alloy or a high conductivity alloy material, close-out layer 18 may also be a super-alloy or high conductivity alloy such as a copper-alloy or the like deposited from a powder form using a known deposition technique such as vacuum plasma spraying (VPS), laser plasma spraying (LPS), resistence roll welding, air plasma spraying, diffusion bonding and the like.

Figure 1D:
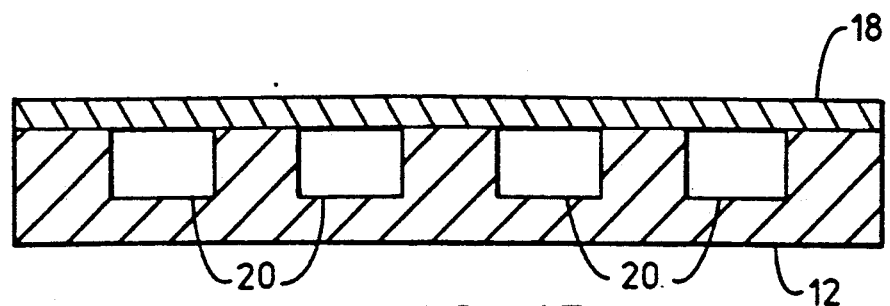

After close-out layer 18 is deposited, solidified slurry segments 16' are removed to form open channels 20 as shown in FIG. 1D. The binder and filler material making up segments 16' may be removed by a water wash (for water soluble fillers, such as a salt or the like), a chemical leaching process or a vacuum extraction process (for a high vapor pressure filler), combustion (for flammable fillers such as carbon) or ultra sonic removal. In one embodiment, substrate 12 may be heated to a sufficiently high temperature to volatize or burn-off the binder material; the remaining filler after volitization of the binder may be removed by one of the techniques described above to form open channels 20 in substrate 12. If VPS is used to apply close-out layer 18, the high temperatures typically used in that process (about 1000 degrees F. to about 1700 degrees F.) will generally burn-off the binder material.

Channels 20 may be cooling channels in the walls of a rocket engine through which a cryogenic fuel is pumped for cooling the walls from the extremely high heat condition under which these type engines operate.

Figure 2A:
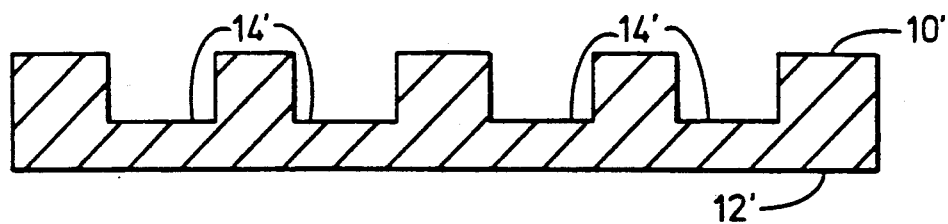
FIGS. 2A–2D, are cross-sectional, side elevation views of the steps employed in the hollow structure fabrication method in accordance with another embodiment of the present invention.
Figure 2B:
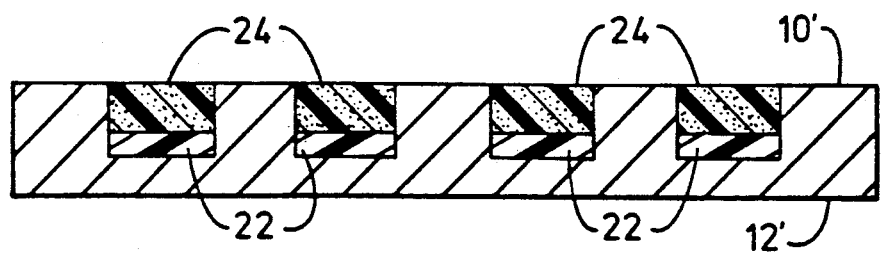
Figure 2C:
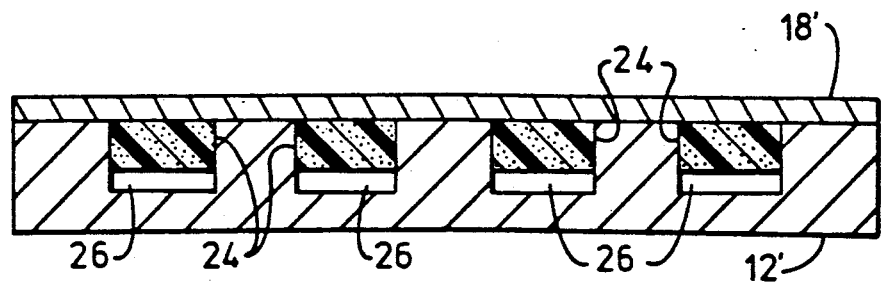
Figure 2D:
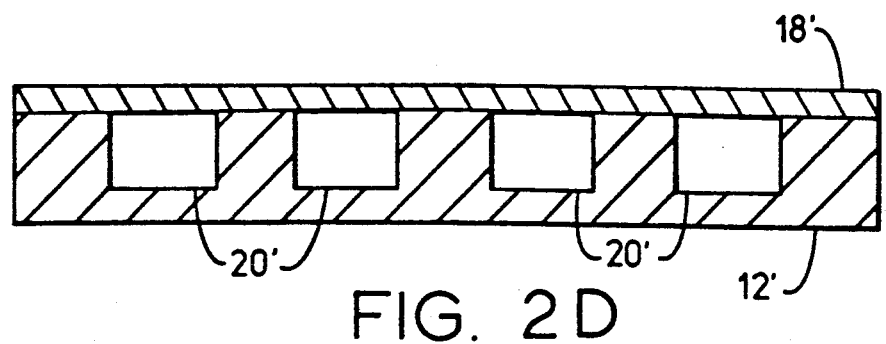

In an alternate embodiment of the present invention, shown in FIGS. 2A-2D, after principal substrate surface 10' is patterned to form grooves 14' (FIG. 2A), a binder material and solvent mixture are deposited into the base of grooves 14', as shown in FIG. 2B. The solvent is evaporated and the binder solidifies to form binder material segments 22. A layer 24 of binder material, solvent and filler material is deposited over binder segments 22; the solvent is evaporated and layer 24 solidifies. A close-out layer 18' is deposited on principal substrate surface 10' and over layers 24 by one of the techniques described above. Substrate 12' may be heated to burn-off layer 22, leaving filler layer 24 to form a bridge structure over channels 26 as shown in FIG. 2C. Referring to FIG. 2D, filler layer 24 may be flushed to form channels 20'.

If substrate 12' is the wall of a rocket engine component or gas turbine engine component made of a high conductivity alloy or super-alloy material, close-out layer 18' may also be a high conductivity alloy or superalloy material deposited by VPS at a temperature between about 1000 degrees F. and about 1700 degrees F.; at these temperatures, an acrylic-type binder material will be volatized and only filler layer 24 will remain after the VPS process, as shown in FIG. 2C. A filler material layer 24 containing salt may then be flushed from the interior of the structure by water to form channels 20' which serve as cooling channels for the engine.

Figure 3A:
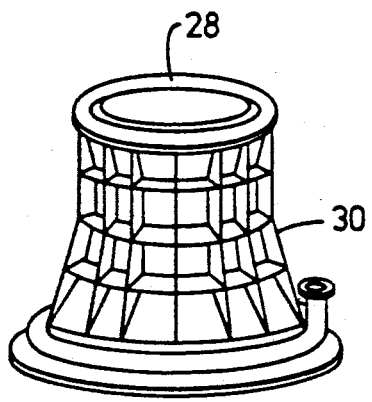
FIG. 3A is a perspective side view of a step employed in the fabrication method of a combustion chamber in accordance with the present invention.
Figure 3E:
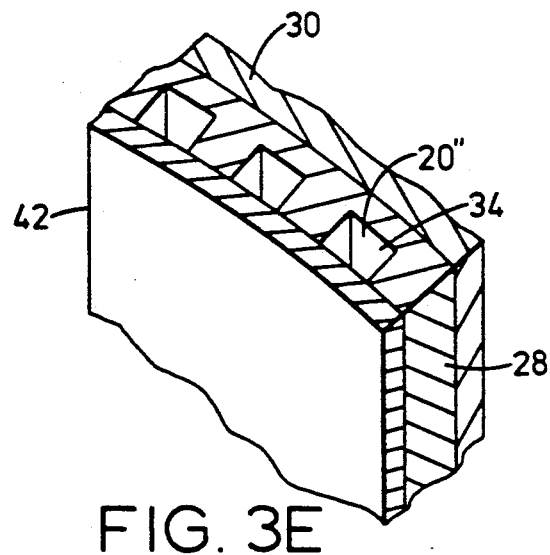
FIGS. 3C–3E are detail cross-sectional views of the side wall of the combustion chamber of FIG. 3A showing the steps employed in the fabricating method of the combustion chamber in accordance with the present invention.
Figure 3C:
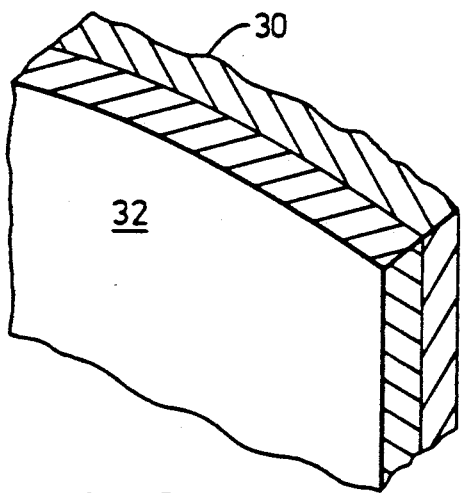
Figure 3D:
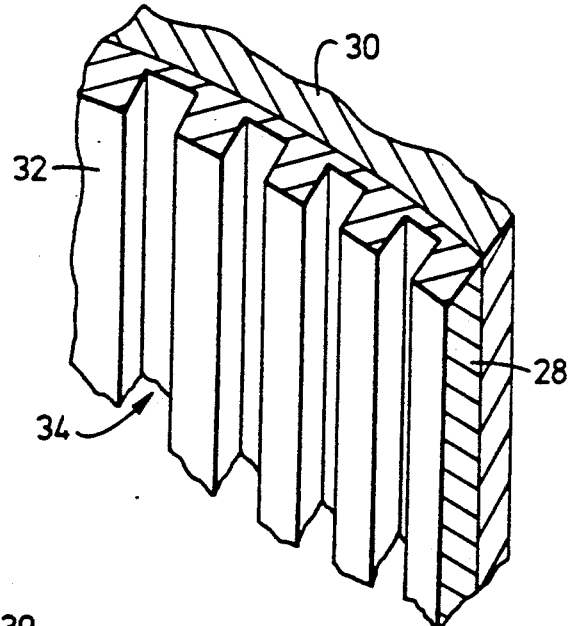
Figure 3F:
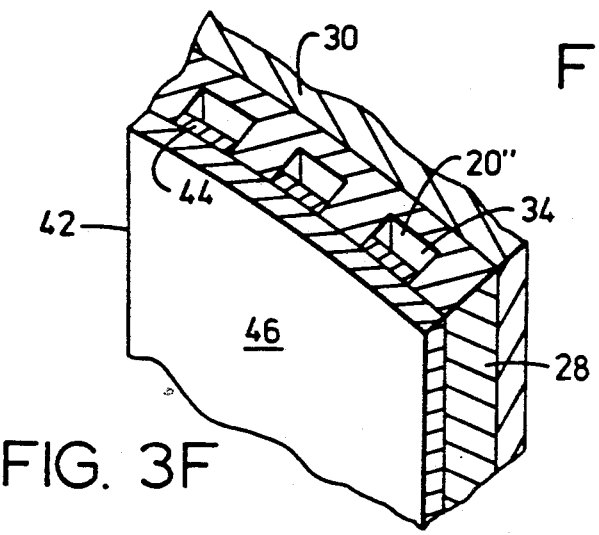
FIG. 3F is a detailed cross-sectional view of the side wall of the combustion chamber of FIG. 3A in accordance with a further embodiment of the present invention.
Figure 3B:
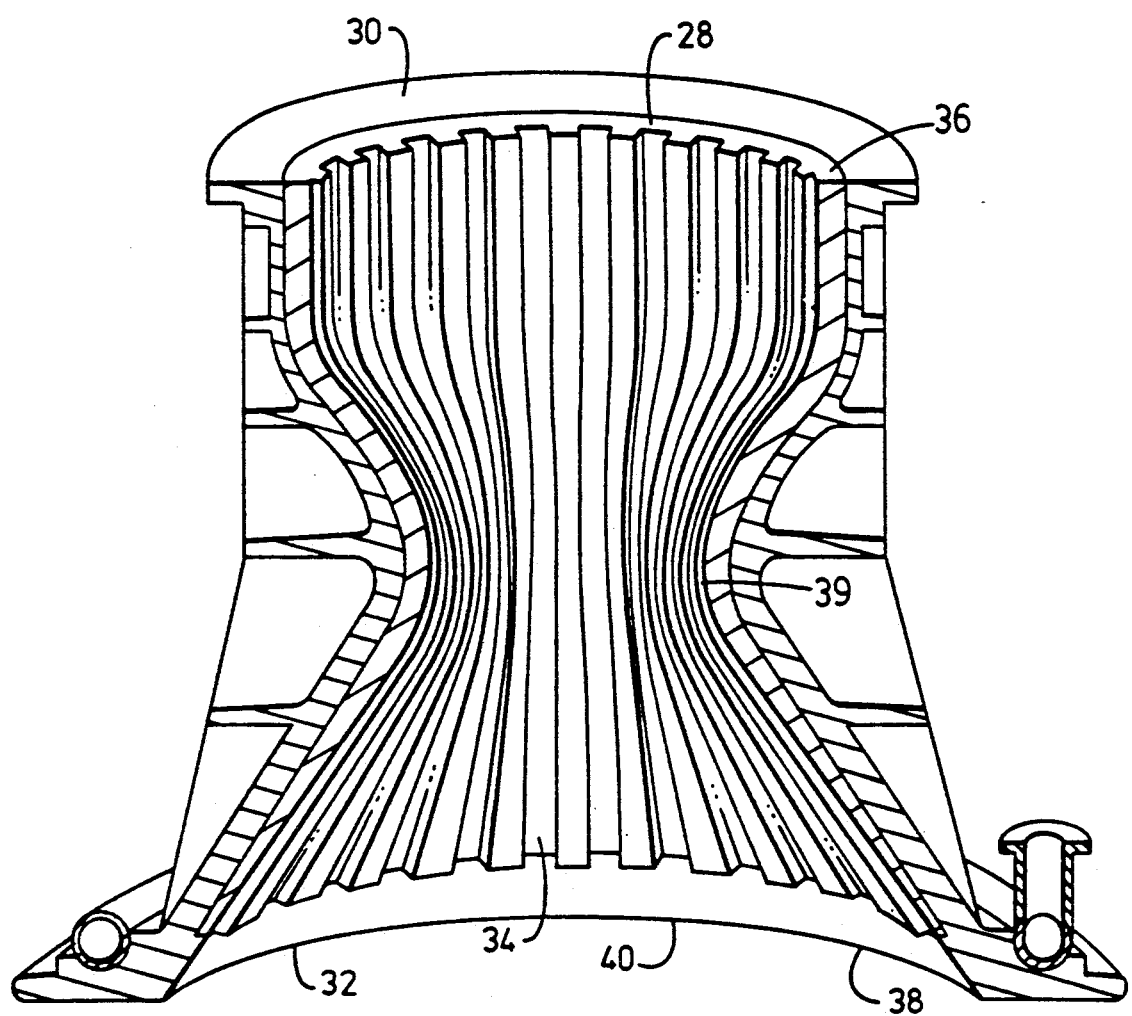
FIG. 3B is a cross-sectional, perspective view of the the combustion chamber of FIG. 3A.

In accordance with the present invention, a method for fabricating cooling channels 20" in the walls of a combustion chamber for a liquid propellant rocket engine is illustrated in FIGS. 3A–3E. FIG. 3A shows the combustion chamber 28 of a high heat resistant superalloy, such as Inconel 625 or the like, formed within the casting jacket 30. Combustion chamber 28 has an interior wall 32 as best shown in FIGS. 3B and 3C. Interior wall 32 is patterned to form a multiplicity of grooves 34 in the inner surface thereof as best shown in FIG. 3D which extend longitudinally along the length of chamber 28 from one end 36 to the opposite end 38 therof (FIG. 3B). While the grooves in FIG. 3B are shown to extend longitudinally from one end of the combustion chamber to the other, in some applications it may be desired to have the cooling channels, formed from the grooves, extend circumferentially around the interior of the combustion chamber. Grooves 34 are preferably less than about one inch deep and less than about one inch in width; the width of the grooves will narrow, however, in the throat section 39 of combustion chamber 28. Grooves 34 are shown enlarged in FIG. 3B relative to the actual size of combustion chamber 28 for purposes of explanation. This narrowing of the grooves is one of the primary advantages of the present invention because it is difficult to machine a mandrel to fit into these grooves which change dimensions along their length. Grooves 34 connect to a manifold 40 at opposite end 38 through which cryogenic fuel will be distributed to the cooling channels 20" (formed from grooves 34 as described in detail hereinbelow) during engine operation.

In accordance with the present invention, grooves 34 are filled with a slurry material in a similar fashion to grooves 14 in FIGS. 1A and 1B. The slurry is preferably a mortar-like compound made from about 10–20% acrylic binder material, about 20–30% solvent, such as a xylene, toluene or the like, and 60–70% filler material, preferably sodium chloride (NaCl) for ease of removal; although, a ceramic powder or a powdered metal may be utilized as well. The mortar-like compound or slurry, formed from these constituents, may be troweled onto the inner surface 32 of combustion chamber 28 and into grooves 34. Any excess slurry is removed from inner surface 32. The solvent is evaporated and the slurry allowed to solidify; combustion chamber 28 may be baked at about 200 degrees F. to about 350 degrees F. for about 2 to about 3 hours to harden the slurry compound. After hardening, a close-out layer 42 of a high heat resistant material is deposited onto inner surface 32 and over slurry filled grooves 34 (FIG. 3E). Close-out layer 42 may be a copper alloy deposited by VPS at a temperature between about 1000 degrees F. and about 1700 degrees F. The high VPS temperature will volatize or burn-off the acrylic binder material. The remaining salt filler may then be flushed from grooves 34 by water.

In a further embodiment of the present invention, shown in FIG. 3F, grooves 34 are only partially filled with the slurry, and a sacrificial layer 44 of material, preferably iron, is deposited into each of partially filled grooves 34 by a known method, such as air plasma spraying or the like. Sacrificial layer 44 may be ground to remove any excess from inner surface 32, and then a coating 46 of a high heat resistant material, such as a copper alloy or the like, is deposited over layer 44 by VPS at a temperature between about 1000 degrees F. and about 1700 degrees F. The high VPS temperature will volatize the binder material, and the remaining filler material may be flushed from the grooves by water. After removing the filler, an etchant may be pumped through the enclosed grooves to remove sacrificial layer 44 and thereby form cooling channels 20", similar to FIG. 3E.

As previously indicated, hollow components of a gas turbine engine may also be fabricated by utilizing the present invention. FIG. 4A shows one portion 48 of a rotor blade 50 having a hollow interior 52 with a plurality of interior walls 54 or baffles to direct cooling air, indicated by arrows 56, through the interior of blade 50 and out holes 58 formed in the convex surface 60 (FIG. 4B) of blade 50, proximate to the blade leading edge 62. Blade portion 48 may be cast with walls 54 formed therein or portion 48 may be machined to form the interior walls.

Figure 4B:
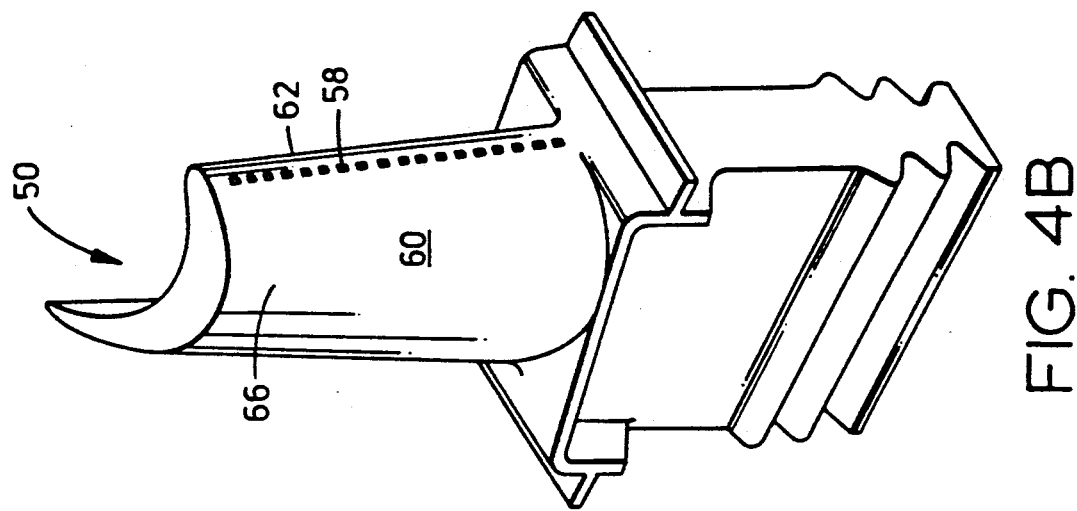
FIG. 4B is a perspective view of a gas turbine engine blade fabricated in accordance with the method of the present invention.
Figure 4A:
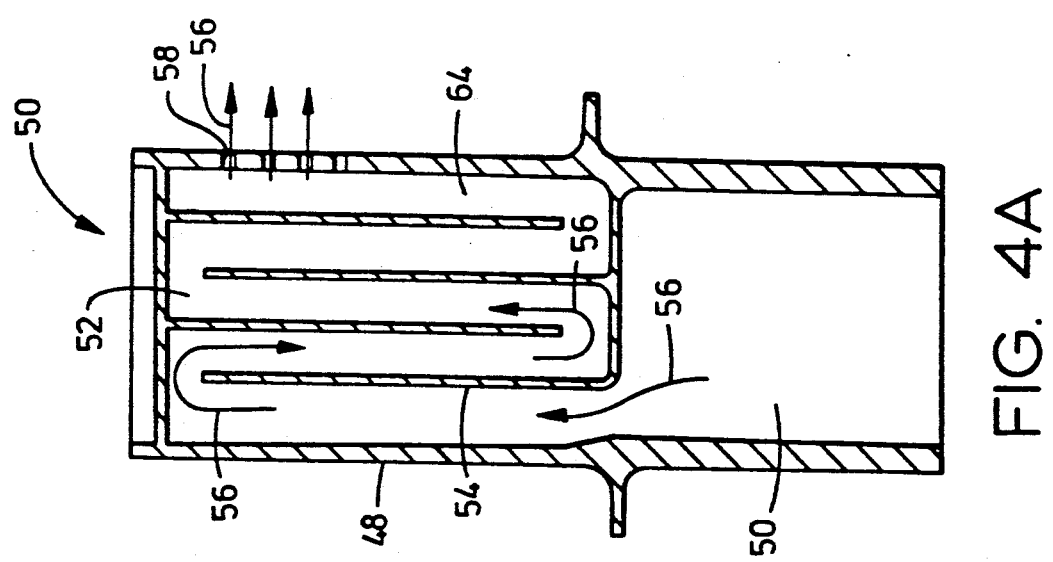
FIG. 4A is a cross-sectional side elevation view of a gas turbine engine blade fabricated in accordance with the method of the present invention.

In accordance with the present invention, hollow openings or voids 64 (FIG. 4A) between interior walls 54 are then filled with the slurry material; the solvent is evaporated to cause the slurry to solidify and a close-out layer 66 which substantially forms convex surface 60 of rotor blade 50 is deposited by a known method, such as VPS or the like, to form the completed hollow rotor blade as shown in FIG. 4B.

It will be readily understood by those skilled in the art that the present invention is not limited to the specific embodiments described and illustrated herein. Different embodiments and adaptations besides those shown herein and described, as well as many variations, modifications, and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. A method for making a gas turbine engine component with a hollow interior, comprising the steps of:
   (a) providing a substrate;
   (b) selectively patterning a principal surface of the substrate;
   (c) forming a slurry comprising a selected amount of a binder material chosen from at least one of an acrylic and a thermoplastic material, a selected amount of a solvent and a selected amount of a filler material chosen from at least one of a salt, a powdered ceramic, sand and a powdered metal;
   (d) inserting the slurry into the substrate surface pattern;
   (e) evaporating the solvent to solidify the slurry;

(f) depositing a close-out layer of material over the patterned substrate surface and over the solidified slurry; and (g) without removing the close-out layer, removing the solidified slurry to provide the engine component with a hollow interior.

2. The method of claim 1, wherein the slurry comprises about 10-20% binder material, about 20-30% solvent and about 60-70% filler material.

3. The method of claim 1, wherein the solvent is at least one of xylene, toluene, isopropyl alcohol and acetone.

4. The method of claim 1, wherein step (e) comprises the step of heating the substrate at a chosen temperature for a selected duration.

5. The method of claim 1, wherein step (e) comprises the step of heating the substrate at a temperature between about 200 degrees F. and about 350 degrees F. for between about 2 hours and about 3 hours.

6. The method of claim 1, wherein step (f) comprises the step of depositing the close-out layer of material by one of vacuum plasma spraying, laser plasma spraying, resistance roll welding, air plasma spraying and diffusion bonding.

7. The method of claim 1, wherein step (g) is accomplished by at least one of flushing with water, etching, chemical leaching, combustion, vacuum extraction and ultrasonic removal.

8. The method of claim 1, further comprising the step of volatizing the binder material before step (g).

9. The method of claim 1, wherein step (f) comprises the step of depositing a layer of a copper alloy by vacuum plasma spraying at a temperature between about 1000 degrees F. and about 1700 degrees F.

10. A method for making a gas turbine engine component with a hollow interior, comprising the steps of:
    (a) providing a substrate;
    (b) selectively patterning a principal surface of the substrate;
    (c) depositing a first layer of material comprising a selected amount of binder material chosen from at least one of an acrylic and a thermoplastic material and a selected amount of a solvent into the substrate surface pattern;
    (d) evaporating the solvent to solidify the first layer;
    (e) depositing a second layer of material comprising at least a filler material chosen from at least one of a salt, a powdered ceramic, sand and a powdered metal into the substrate surface pattern on the first layer of material;
    (f) depositing a close-out layer of material over the patterned substrate surface and over the second layer of material;
    (g) without removing the close-out layer, removing the first layer of material; and
    (h) without removing the close-out layer, removing the second layer of material.

11. A method for making a combustion chamber for an engine, comprising the steps of:
    (a) forming an inner wall of the combustion chamber from a high heat resistant material;
    (b) forming a multiplicity of grooves in the combustion chamber inner wall;
    (c) forming a slurry comprising a selected amount of a binder material chosen from at least one of an acrylic and a thermoplastic material, a selected amount of a solvent and a selected amount of a filler material chosen from at least one of a salt, a powdered ceramic, sand and a powdered metal;
    (d) inserting the slurry into each of the multiplicity of grooves;
    (e) evaporating the solvent to solidify the slurry;
    (f) depositing a close-out layer of high heat resistant material over the inner wall and over the solidified slurry to enclose the grooves; and
    (g) without removing the close-out layer, removing the solidified slurry in each of the enclosed grooves to provide a multiplicity of cooling channels.

12. The method of claim 11, wherein the slurry comprises about 60-70% filler material, about 20-30% solvent and about 10-20% binder material.

13. The method of claim 11, wherein the solvent is at least one of xylene, toluene, isopropyl alcohol and acetone.

14. The method of claim 11, wherein step (e) comprises the step of heating the substrate at a temperature between about 200 degrees F. and about 350 degrees F. for between about 2 hours and about 3 hours.

15. The method of claim 11, wherein step (f) comprises the step of depositing the close-out layer of material by one of vacuum plasma spraying, laser plasma spraying, resistance roll welding, air plasma spraying and diffusion bonding.

16. The method of claim 11, wherein step (g) is accomplished by at least one of flushing with water, etching, chemical leaching, combustion, vacuum extraction and ultrasonic removal.

17. The method of claim 11, further comprising the step of volatizing the binder material before step (g).

18. The method of claim 11, wherein step (f) comprises the step of depositing a layer of a copper alloy by vapor plasma spraying at a temperature between about 1000 degrees F. and about 1700 degrees F.

19. The method of claim 11, wherein step (d) comprises the step of partially filling each of the multiplicity of grooves with the slurry, and further comprising the step of depositing a layer of sacrificial material into each of the partially filled grooves.

20. The method of claim 19, wherein the sacrificial material is iron.

21. The method of claim 19, further comprising the step of pumping an etchant through each of the multiplicity of enclosed grooves to remove the sacrificial material.

* * * * *